United States Patent [19]

Rehrig

[11] 4,176,849
[45] Dec. 4, 1979

[54] PLASTIC CHILD SEAT BACK FOR CART

[76] Inventor: Houston Rehrig, 1401 S. Oak Knoll Ave., Pasadena, Calif. 91109

[21] Appl. No.: 792,052

[22] Filed: Apr. 28, 1977

Related U.S. Application Data

[63] Continuation-in-part of Ser. No. 681,462, Apr. 29, 1976, Pat. No. 4,065,142.

[51] Int. Cl.$^2$ ............................................... B62B 3/02
[52] U.S. Cl. ................................ 280/33.99 B; 40/395
[58] Field of Search ................. 280/33.99 B, 33.99 A, 280/33.99 R, 33.99 H, 33.99 F, 33.99 C, DIG. 4; 220/73, 244, 324, 326, 340, DIG. 14, DIG. 15; 16/172, 145; 211/150; 40/308, 13, 14, 104.06, 104.07

[56] References Cited

U.S. PATENT DOCUMENTS

| | | | |
|---|---|---|---|
| 2,997,311 | 8/1961 | Umanoff | 280/33.99 B |
| 3,023,018 | 2/1962 | Welter | 40/308 |
| 3,537,212 | 11/1970 | Gilles | 16/172 |
| 3,815,701 | 6/1974 | Mayhew | 16/172 |
| 3,966,084 | 6/1976 | Box | 220/326 |
| 3,999,774 | 12/1976 | Rehrig | 280/33.99 R |
| 4,046,394 | 9/1977 | Thompson, Jr. | 280/33.99 B |

*Primary Examiner*—David M. Mitchell

*Attorney, Agent, or Firm*—Schuyler, Birch, McKie & Beckett

[57] ABSTRACT

A child's seat comprising a plastic seat panel and a plastic leg opening cover both of which are pivotally mounted at their rear edges on a transverse support wire, that itself is slidably mounted upon the cart rear frame. The forward edge of the seat panel has a plurality of curved flanges that engage a support wire mounted on the seat back frame. Interaction between the flanges, the wire, and the edges of a recess in the seat back frame adjacent to the wire holds the components interlocked, while allowing the pivot movement of the seat panel with respect to the seat back frame. A reinforced plastic seat back frame has two leg portions each terminating at its bottom in an S-shaped portion that fits into an opening in the cart rear panel to support the seat back frame and allow pivotal movement thereof. The plastic seat back frame is reinforced by a pattern of integrally molded ribs. Additional reinforcement is obtained by utilizing metal inserts placed in channels between adjacent ribs. The rear side of the seat back contains a molded recess section in which advertising material can be placed. The material is protected by a plastic window which snaps into a locked position in the recess section.

6 Claims, 9 Drawing Figures

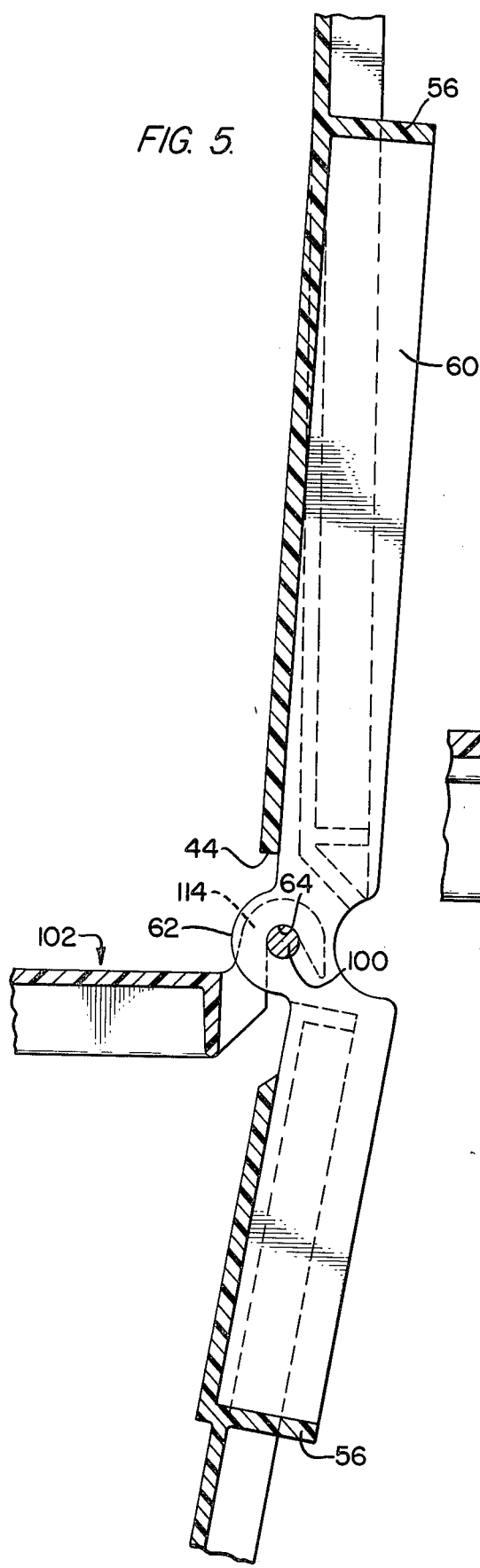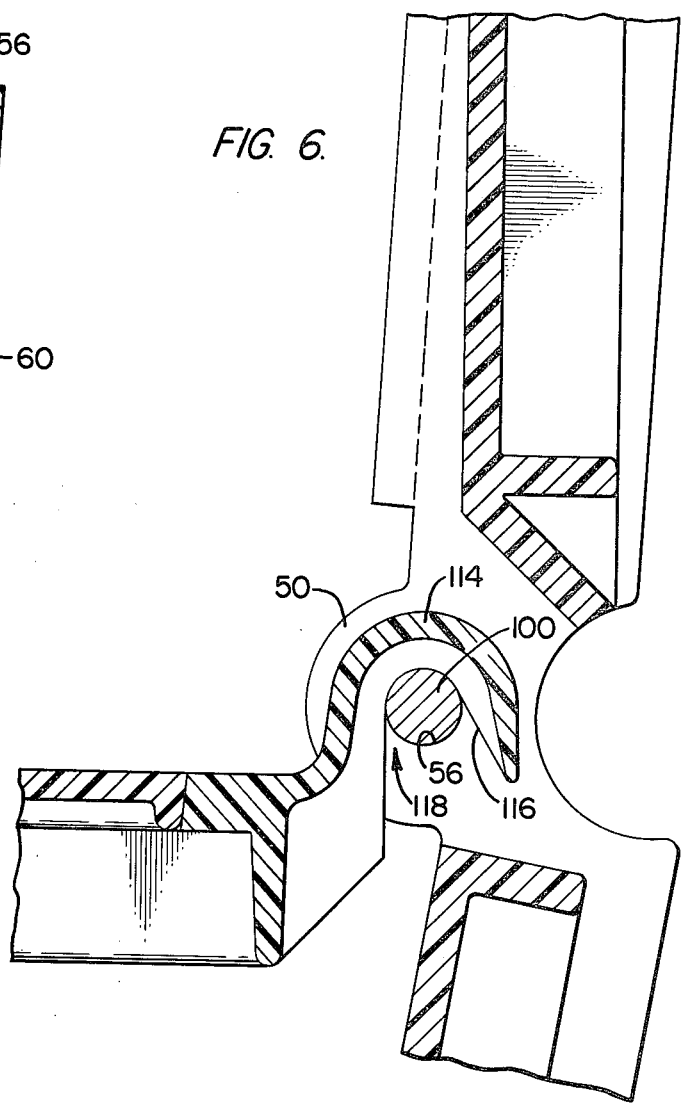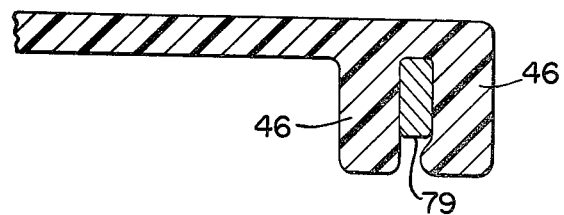

PLASTIC CHILD SEAT BACK FOR CART

RELATED APPLICATION

This is a continuation-in-part of copending application Ser. No. 681,462, filed Apr. 29, 1976, now U.S. Pat. No. 4,065,142.

BACKGROUND OF THE INVENTION

The invention relates generally to the field of carts used for supermarkets and the like, it is directed particularly to a new and novel child seat for use with these carts.

A grocery cart such as that with which the new child seat can be used is found applicant's U.S. Pat. No. 3,999,774. The present application is directed to a novel plastic child seat that has several advantages over the prior art devices. Chief among these advantages are light weight, attractiveness, impact resistance, ease of cleaning and elimination of rust and corrosion. Prior art seat back frames have been of metal and have required complex interlocking means for coupling the seat back frame to the cart rear frame and the seat panel. The present invention involves a seat back frame having a reinforced plastic panel which is installed in an interlocked and novel manner that enhances the construction, assembly, operation and repair of grocery carts and the like.

SUMMARY OF THE INVENTION

It is an object of this invention to provide a plastic child seat back frame for a grocery cart or the like which overcomes the disadvantages of the prior art devices.

A specific object of this invention is to provide a new and improved seat back frame which facilitates assembly and repair of grocery carts and the like.

Another specific object is to provide a new and improved seat back frame which is more simple in construction than prior art devices, and which necessitates the use of fewer components.

Another specific object is to provide a new and improved cart in which the seat back is easy to clean.

Still another specific object is to provide a new and improved seat back in which the frame is easily replaced.

A further specific object is to provide a new and improved seat back frame which is lighter in weight than prior art seat backs.

Another specific object is to provide a new and improved seat back frame which is more attractive than prior art frames, and which maintains this attractiveness over a long period of time.

A further object of this invention is to provide a new and improved seat back frame which can accept advertising promotional information.

The seat back frame of the present invention is almost entirely open lattice construction, which makes it light and easy to clean. Rigidity is provided to the back frame by the use of integral reinforcing ribs, and also by a novel interrelationship among the back frame, the rear frame, the seat panel, and other components. Additional reinforcement is provided by utilizing metal inserts placed in channels between the ribs and/or a metal insert placed in the channel between the ribs extending around the perimeter of the upper portion of the back frame.

The seat back frame has downwardly extending leg members, each of which terminate in an S-shaped portion. The cart rear panel has openings for receiving these S-shaped portions, and this construction provides simple and effective pivotal mounting of the seat back frame upon the cart rear panel. The S-shaped portion is so oriented that, once installed and coupled to the other seat components, it cannot become disengaged from the cart rear panel unless broken or disassembled.

The seat panel has at its forward edge a plurality of downwardly opening generally U-shaped flanges that engage a support wire mounted in an opening in the seat back panel. Once engaged with the wire and pivoted to operating position the flanges are restrained against disengaging movement by the edge of the opening in the seat back panel. The rearward edge of the seat panel has recesses that engage another support wire. Also engaging this wire are recesses in a panel that can close the child seat leg openings in the cart rear panel. The leg closure panel and the seat panel interact in such a manner as to be locked on the support wire, although they are pivotally movable.

A full understanding of the novel concepts of this invention will be obtained from a consideration of the preferred embodiments of the invention, explained herein.

BRIEF DESCRIPTION OF THE DRAWINGS

FIG. 5 is a view taken through line 5—5 of FIG. 2 showing the hinging wire support member and the seat panel flange.

FIG. 6 is a view taken through line 6—6 of FIG. 2 showing the hinging wire and metal reinforcing means.

FIG. 7 is a view taken along line 7—7 of FIG. 4 showing a reinforcing member placed in a channel between the ribs extending along the perimeter of the back frame.

DESCRIPTION OF THE PREFERRED EMBODIMENT

Figure 1:
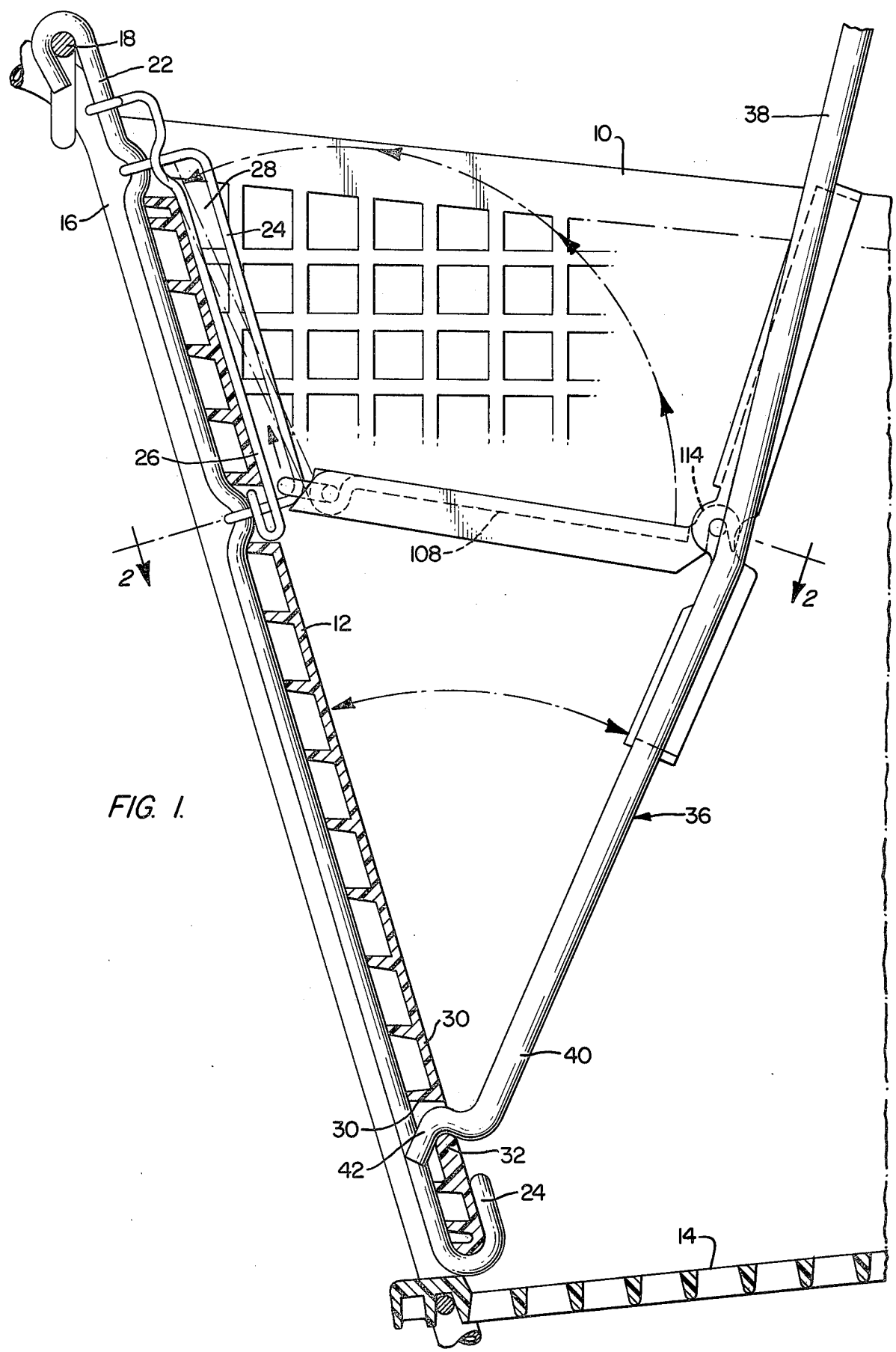
FIG. 1 is a side view, partially in section, of the inventive seat back frame in the open position.

This invention is directed to a back seat frame used with a foldable child seat and for use in a cart such as a supermarket cart. As shown in FIG. 1, the cart comprises a side panel 10, a rear panel 12, and a bottom panel 14. Rear panel 12 is provided with two openings in the upper porton through which the legs of a child extend when sitting in the child seat. The two upstanding rear corner posts 16 of the cart frame support a pair of rear panel rods 18, upon which is pivotally mounted the basket rear panel 12. This must pivot upwardly when a plurality of baskets are nested. Basket rear panel 12 is mounted on a pair of vertical support wires 22. Each support wire 22 terminates at its lower end in a U-shaped portion 24. A pair of forward slide wires 24 and a pair of rear slide wires 26 are mounted on support wires 22, to define a slide recess 28. A pair of openings 30 are provided in the lower portion of cart rear panel 12, to support the child seat structure, as explained below. The lower edge of each opening 30 is defined by a heavy rib 32, capable of supporting and acting as the pivot point for the child seat.

The child seat comprises a seat back frame, a seat panel, and a closure panel for closing the leg openings in cart rear panel 12 when the child seat is being used as a receptical for grocery items, or the like. Seat back frame 36 comprises an upper or back portion 38 and a lower portion comprising a pair of leg members 40. Each leg member 40 terminates at its free end in an S-shaped portion 42 that fits into an opening 30 in cart rear panel 12. Insertion and removal of S-shaped portions 42 can only be accomplished when seat back frame 36 is substantially parallel to cart bottom panel 14. Once seat back frame 36 is in its operating position, it is supported for pivotal movement by ribs 32.

Figure 4:
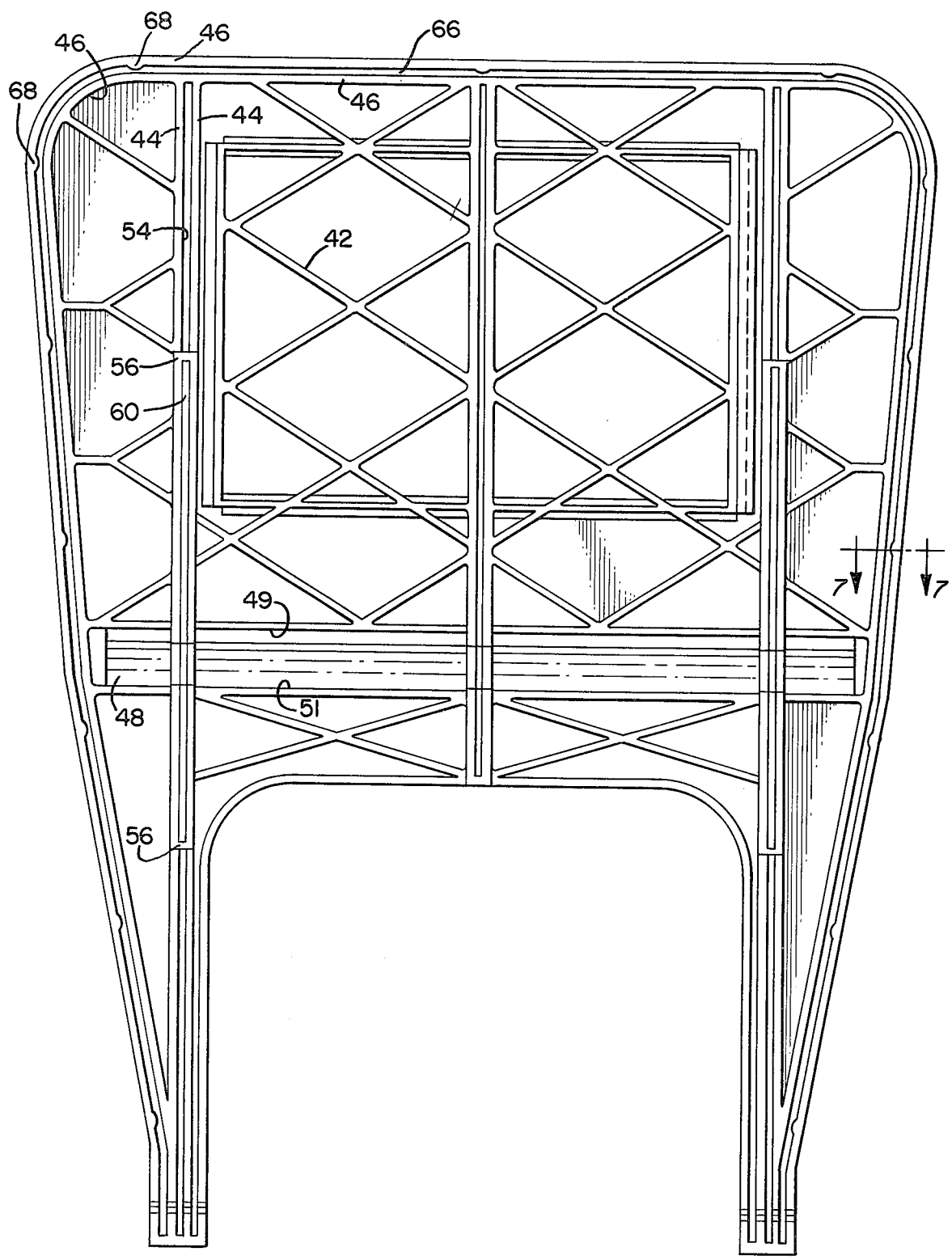
FIG. 4 is a view of the forward side of the seat back frame showing the reinforcing structure.

FIG. 4 shows the forward side of the plastic seat back frame 36. Reinforcement is provided by integrally formed plastic ribs including intersecting diagonal members 42, parallel vertical members 44, and perimeter members 46 extending along the perimeter of the back frame. The parallel vertical ribs 44 extend through an elongated horizontal opening 48, at which point they include outwardly extending portions 50, each having an opening 52, as shown best in FIG. 6. Opening 48 is defined by an upper edge 49, and a lower edge 51.

Sets of ribs 44 are spaced slightly from one another to define therebetween a channel 54. The outward pairs of ribs 44 also have, at their mid-portions, horizontal cross-ribs 56 that define a portion of channel 54 in which can be installed a metal support rib 60, which provides additional stiffening for the seat back structure. Each of the two ribs 60 has an outwardly protruding portion 62 that essentially matches portions 50 of ribs 44, and which have also a matching opening 64. Ribs 60 are held in place by close fit within channels 54, and by the action of other components as described below.

The pairs of perimeter ribs 46 define therebetween a perimeter channel 66, into which protrudes a plurality of shoulders 68. An additional metal reinforcing rib 79 (FIG. 7) can be installed in channel 66, wherein it is held in place by wedging action with shoulders 68. Either or both sets of metal reinforcing ribs can be utilized. However, ribs 60 add support to the seat panel, as will be described below, and thus offer an additional advantage.

Figure 3:
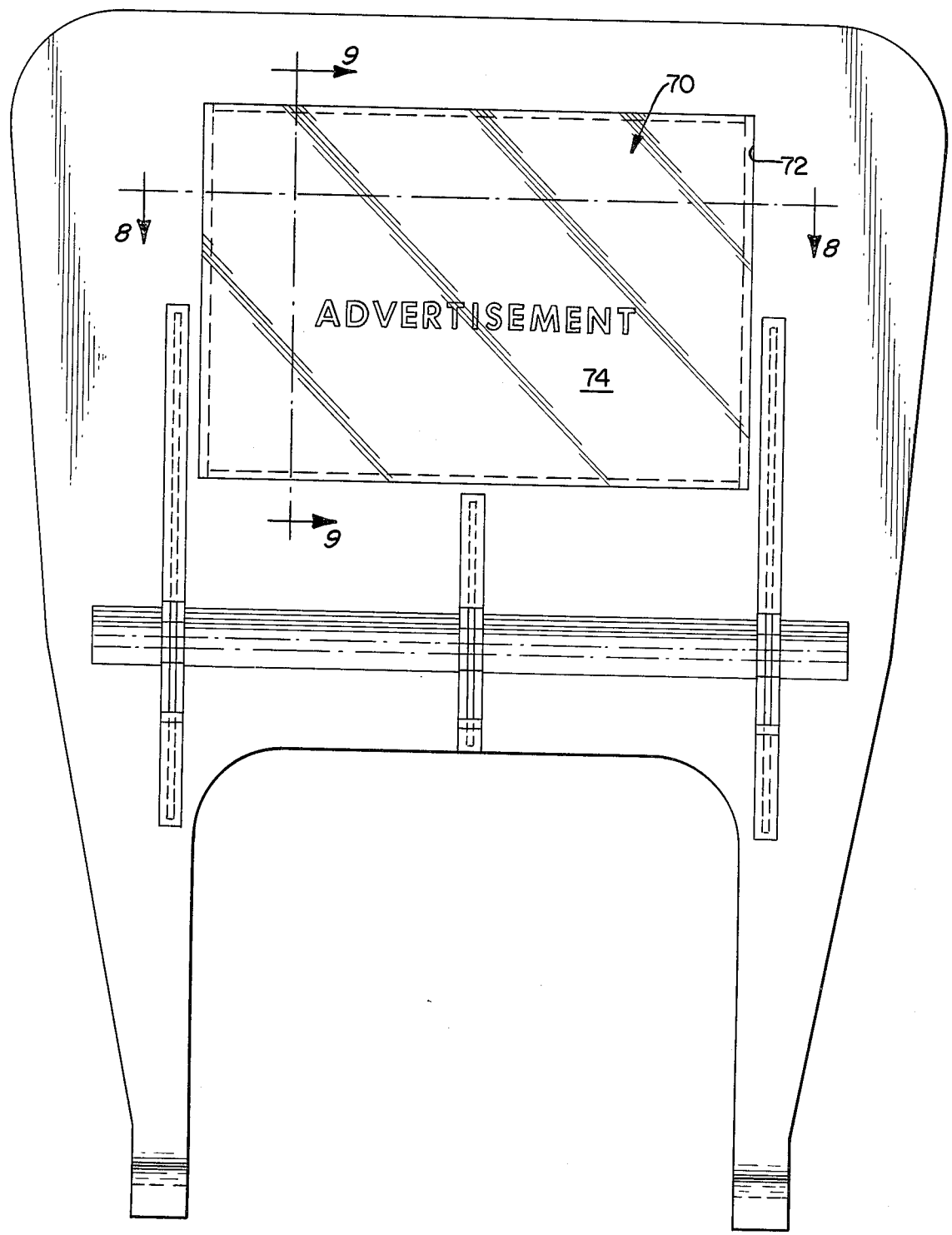
FIG. 3 is a view of the rear side of the seat back frame showing the recessed section which accepts promotional information.
Figure 8:
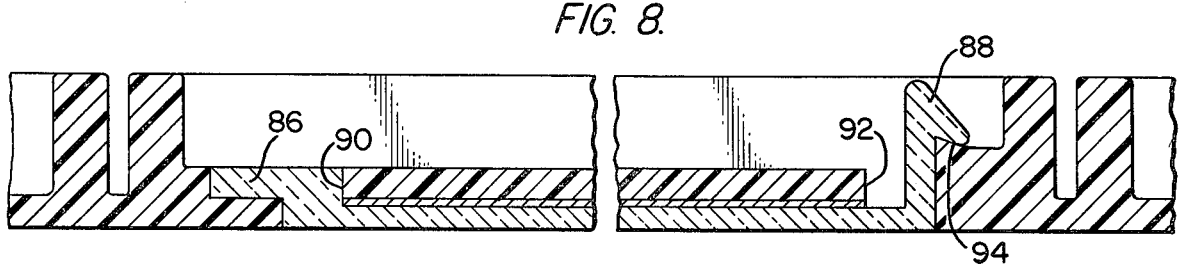
FIG. 8 is a view taken along line 8—8 of FIG. 3 showing the molded recess section which accepts advertising information; both the offset ledge and the fishhook fastener of the plastic window is shown.
Figure 9:
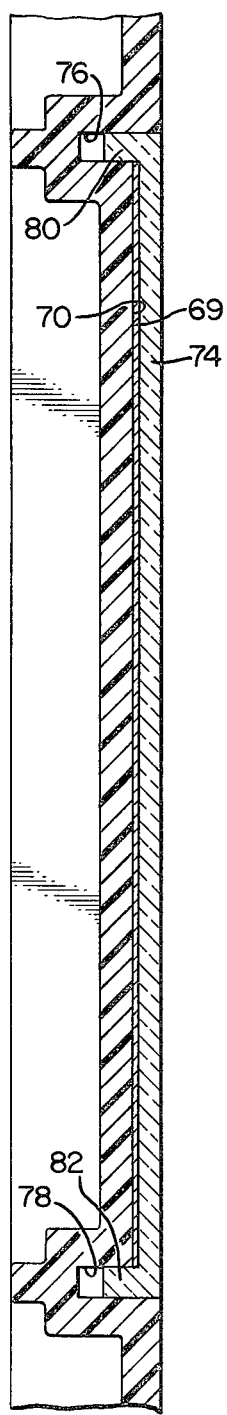
FIG. 9 is a view taken along line 9—9 of FIG. 3 showing the stiffened edges of the plastic window accepted by the grooves of the recessed section.

A device for displaying promotional material is provided in the surface of seat back panel 36 that faces the person pushing the cart. This is best shown in FIG. 3. The promotional material 69 is mounted in a holder 70, that fits into a recess 72. It is covered by a clear plastic window 74. The relationship of elements is best shown in FIGS. 8 and 9. The upper and lower edges of the recess are provided with grooves 76 and 78, into which shoulders 80 and 82 of upper and lower edges of transparent window 74 extend (FIG. 9). One side edge of window 74 is provided with an offset ledge 86 (FIG. 8) and the opposite side edge with a hook 88. Ledge 86 is received in a slot 90 at the side edge of recess 70. Hook 88 is received in another slot 92 in the opposite edge, and engages a shoulder 94. The hook is opened from the rear of the seat back frame. Window 74 is installed by first fitting ledge 86 into slot 90, and then pivoting the window closed until hook 88 is engaged.

A front seat support wire 100 is installed through openings 56 and 64 in the seat back frame. This supports the forward edge of seat panel 102.

Figure 2:
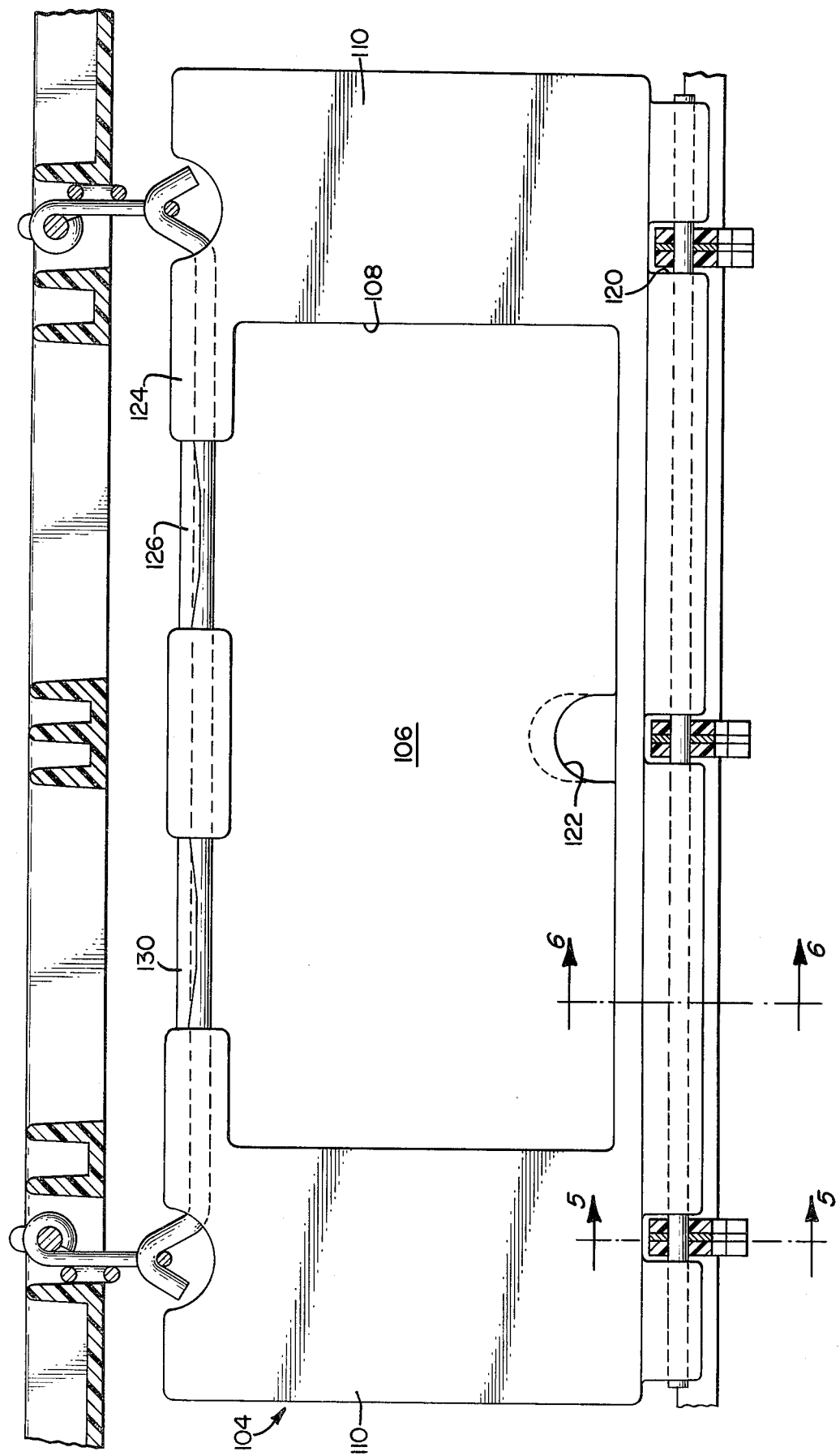
FIG. 2 is a view taken through line 2—2 of FIG. 1 with the leg opening cover in the down position including the hinging wire support means and vertical reinforcing means.

As best shown in FIGS. 1 and 2, the child seat comprises a seat panel 104 and a leg opening cover 106. Seat panel 104 comprises recessed center portion 108 flanked by surface portions 110. The recess accommodates the leg opening cover when it is in the down position. The forward edge of seat panel 104 terminates in a plurality of upstanding curved flange portions 114 inside which are a plurality of ribs 116, each of which define a downwardly opening recess 118. Openings 120 accommodate the ribs at protuberances 50 and 62. Front seat support wire 100 is received in recesses 118. Adjacent to this forward edge is a finger opening 122, which facilitates movement of the leg opening cover from its horizontal position to its upstanding position.

At the rear edge of base panel 104 there are a number of extensions 124 and interdigitating extensions 126 on the leg opening cover 106. These engage a rear support wire 130, that slides on the wires 24 and 26, on the rear cart panel. The details of the construction and interrelationship of these elements is discussed in my copending application Ser. No. 681,462 filed Apr. 29, 1976, now U.S. Pat. No. 4,065,142.

To assemble the components, base panel 104 is first oriented downwardly substantially parallel to seat back frame 36, so that the free ends of curved flanges 114 can be inserted between front support wire 100 and the upper edge 49 of seat back frame recess 48. Then, seat panel 104 is pivoted upwardly to substantially a horizontal position and the rear edge components installed. The distance between edge 49 and support wire 100 is less than the distance between the top surface of flanges 14 and the top of the flange hook, so that once the seat panel 102 is placed in the substantially horizontal position shown in FIGS. 1, 4, 5 and 6, the flanges cannot be disengaged from wire 100. Thus, all parts are locked together without the use of additional hardware.

While modifications and variations of the above-described preferred embodiment may become evident to those skilled in the art, it should be understood that the scope of the invention is governed by the appended claims.

I claim:

1. A child seat for a grocery cart or the like having a rear cart panel, comprising:

a movable plastic seat back frame having a lower portion terminating in at least one downwardly curved mounting member, at least one opening in the lower portion of said rear cart panel for closely receiving said curved member, whereby said seat back frame is pivotally movable between an open position pivoted away from said cart rear panel and a closed position adjacent to said cart rear panel, a seat panel pivotally attached at one end to said seat back frame and movably attached at the other end to said cart rear panel, said curved member having a terminal portion substantially parallel to said seat back frame and said opening is oriented substantially perpendicular to said rear cart panel, whereby said curved member can be installed in said opening only when said seat back frame is substantially perpendicular to said rear cart panel, said seat back frame being pivoted upwardly therefrom to an operating position and not disengageable in that position, and whereby said curved member can be removed from said opening only when said seat back frame is substantially perpendicular to said rear cart panel, wherein said seat back frame further comprises at least one laterally extending opening defined in part by an upper edge, and further comprising seat panel attachment means including a support rod installed in said opening and spaced from said upper edge and a hook extending from said one end having a recess in which said support wire is received, said hook having an opening substantially perpendicular to said seat panel, the distance between said upper edge and said support wire being less than the length of a terminal portion of said hook, whereby said hook can be engaged with said support wire only when said seat panel is oriented downwardly substantially parallel to said seat back frame, and said seat panel cannot be disengaged from said support wire when pivoted upwardly to substantially a horizontal position.

2. The child seat of claim 1 further comprising a plurality of substantially vertical ribs on said seat back frame and extending through said opening in said seat back frame, said support wire being mounted in holes in said ribs, and further comprising a plurality of stiff reinforcement members of metal or the like installed adjacent to said ribs, said reinforcement members having holes aligned with said holes in said ribs and also supporting said support rod.

3. The child seat of claim 2 wherein said ribs are on a face of said seat back panel distant to said seat panel, and said reinforcing members are flattened rods and are installed in channels in said ribs.

4. The child seat of claim 3 further comprising a channel around at least a portion of the upper perimeter of said seat back panel, and a second reinforcing member of metal or the like installed in said channel.

5. A child seat for a grocery cart or the like having a rear cart panel, comprising:

a movable plastic seat back frame having a lower portion terminating in at least one downwardly curved mounting member, an opening in the lower portion of said rear cart panel for closely receiving said curved member, whereby said seat back frame is pivotally movable between an open position pivoted away from said cart rear panel and a closed position adjacent to said cart rear panel, a seat panel pivotally attached at one end to said seat back frame and movably attached at the other end to said cart rear panel, a display panel in that surface of said seat back panel that faces the user of the cart, said display panel comprising means for supporting promotional material or the like, and means for holding said promotional material in said supporting means, said holding means comprising panel means having at one edge first hinge means engageable with second hinge means on said seat back panel and on an opposite edge first locking means engageable with second locking means on said seat back panel.

6. The child seat of claim 5 wherein said first hinge means comprises a recess in said seat back panel, said second hinge means comprises a flange insertable into said recess, said first locking means comprises a hook and said second locking means comprises a second recess having a shoulder engageable with said hook.

* * * * *